(12) United States Patent
Yoo et al.

(10) Patent No.: US 12,461,377 B2
(45) Date of Patent: Nov. 4, 2025

(54) HEAD MOUNT DISPLAY DEVICE, METHOD FOR COMPENSATING IMAGE OF HEAD MOUNT DISPLAY DEVICE AND HEAD MOUNT DISPLAY SYSTEM

(71) Applicant: Samsung Display Co., LTD., Yongin-si (KR)

(72) Inventors: Hyunseuk Yoo, Yongin-si (KR); Sangjin Pak, Yongin-si (KR); Myungwoo Lee, Yongin-si (KR); Wonhee Lee, Yongin-si (KR); Manseung Cho, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/529,027

(22) Filed: Dec. 5, 2023

(65) Prior Publication Data

US 2024/0280826 A1 Aug. 22, 2024

(30) Foreign Application Priority Data

Feb. 16, 2023 (KR) .......................... 10-2023-0020782

(51) Int. Cl.
*G02B 27/01* (2006.01)
*G02B 27/00* (2006.01)

(52) U.S. Cl.
CPC ..... *G02B 27/0179* (2013.01); *G02B 27/0093* (2013.01); *G02B 27/0172* (2013.01); *G02B 2027/014* (2013.01); *G02B 2027/0141* (2013.01)

(58) Field of Classification Search
CPC ............ G02B 27/0179; G02B 27/0093; G02B 27/0172; G02B 2027/014; G02B 2027/0141

See application file for complete search history.

(56) References Cited

U.S. PATENT DOCUMENTS

| | | | |
|---|---|---|---|
| 10,984,759 | B2 | 4/2021 | Chun et al. |
| 2019/0318677 | A1* | 10/2019 | Lu .................... G02B 27/0093 |
| 2020/0082796 | A1* | 3/2020 | Chun .................... G09G 5/38 |
| 2020/0279110 | A1* | 9/2020 | Omata .................. G06F 3/011 |
| 2021/0090218 | A1* | 3/2021 | Ernst .................... G06F 18/23 |

FOREIGN PATENT DOCUMENTS

KR  10-2510458  3/2023

* cited by examiner

*Primary Examiner* — Amit Chatly
(74) *Attorney, Agent, or Firm* — Harness, Dickey & Pierce, P.L.C.

(57) ABSTRACT

A head mount display device includes a display panel including pixels, a shifter that divides the display panel into a reference area including a reference point and a peripheral area surrounding the reference area, and determines each of the reference area and the peripheral area as one of an upscaling area and a downscaling area, and a scaler that scales input image data based on the upscaling area and the downscaling area.

21 Claims, 9 Drawing Sheets

HEAD MOUNT DISPLAY DEVICE, METHOD FOR COMPENSATING IMAGE OF HEAD MOUNT DISPLAY DEVICE AND HEAD MOUNT DISPLAY SYSTEM

CROSS REFERENCE TO RELATED APPLICATION(S)

This application claims priority to and benefits of Korean Patent Application No. 10-2023-0020782 under 35 USC § 119, filed on Feb. 16, 2023, in the Korean Intellectual Property Office (KIPO), the entire contents of which are incorporated herein by reference.

BACKGROUND

1. Technical Field

Embodiments of the disclosure relate to a head mount display device, a method for compensating an image of the head mount display device and a head mount display system which perform pixel shift operation.

2. Description of the Related Art

In case that a fixed image in a head mount display (HMD) device is displayed at a specific position for a long time, pixels corresponding to the specific position may deteriorate and afterimage may occur. A pixel shift operation in which the fixed image is shifted within a certain pixel range may be performed in order to prevent the deterioration and the afterimage.

However, unlike general display devices, the head mount display device is disposed very close to the user's eyes. Therefore, in case that the pixel shift operation is performed in the head mounted display device, image shaking may be recognized by the user, and accordingly, the user may experience motion sickness or nausea. For example, in case that the pixel shift operation is performed in vertical or horizontal directions, the user may experience motion sickness or nausea.

SUMMARY

Embodiments of the disclosure provide a head mount display device for performing a pixel shift operation based on a reference point of a display panel.

Embodiments of the disclosure provide a method for compensating an image of a head mount display device for performing a pixel shift operation based on a reference point of a display panel.

Embodiments of the disclosure provide a head mount display system for performing a pixel shift operation based on a reference point of a display panel.

In an embodiment, a head mount display device may include a display panel including pixels, a shifter that divides the display panel into a reference area including a reference point and a peripheral area surrounding the reference area, and determines each of the reference area and the peripheral area as one of an upscaling area and a downscaling area, and a scaler that scales input image data based on the upscaling area and the downscaling area.

In an embodiment, the reference point may be a center point of the display panel.

In an embodiment, the head mount display device may further include a sight tracker that outputs sight data including a position of a user's sight on the display panel.

In an embodiment, the reference point may be determined based on the sight data.

In an embodiment, the sight data may include the position of the user's sight tracked in real time.

In an embodiment, in case that the user's sight is present at a first position for a time or longer, the sight tracker may output the sight data for the first position.

In an embodiment, in case that the reference area is the upscaling area and the peripheral area is the downscaling area, the input image data may be scaled from the reference area to the peripheral area.

In an embodiment, in case that the reference area is the downscaling area and the peripheral area is the upscaling area, the input image data may be scaled from the peripheral area to the reference area.

In an embodiment, the input image data may be scaled at a period.

In an embodiment, the input image data may be scaled within a range value.

In an embodiment, a method for compensating an image of a head mount display device may include dividing a display panel into a reference area including a reference point and a peripheral area surrounding the reference area, determining each of the reference area and the peripheral area as one of an upscaling area and a downscaling area, and scaling input image data based on the upscaling area and the downscaling area.

In an embodiment, the reference point may be a center point of the display panel.

In an embodiment, the method may further include outputting sight data including a position of a user's sight on the display panel.

In an embodiment, the reference point may be determined based on the sight data.

In an embodiment, the sight data may include the position of the user's sight tracked in real time.

In an embodiment, the method may further include, in case that the user's sight is present at a first position for a time or longer, outputting the sight data for the first position.

In an embodiment, in case that the reference area is the upscaling area and the peripheral area is the downscaling area, the input image data may be scaled from the reference area to the peripheral area.

In an embodiment, in case that the reference area is the downscaling area and the peripheral area is the upscaling area, the input image data may be scaled from the peripheral area to the reference area.

In an embodiment, a head mount display system may include a display panel including pixels, a driving controller that receives input image data from an application processor and converts the input image data into a data signal, and a data driver that outputs a data voltage to the display panel based on the data signal. The application processor may include a shifter that divides the display panel into a reference area including a reference point and a peripheral area surrounding the reference area, and determines each of the reference area and the peripheral area as one of an upscaling area and a downscaling area, and a scaler that scales the input image data based on the upscaling area and the downscaling area.

In an embodiment, the head mount display system may further include a sight tracker that outputs sight data including a position of a user's sight on the display panel.

According to embodiments, the head mount display device, the method, and the head mount display system may divide the display panel into the reference area including the reference point and the peripheral area surrounding the reference area, determine each of the reference area and the peripheral area as one of the upscaling area and the downscaling area, and scale the input image data based on the upscaling area and the downscaling area so that the pixel shift operation considering the reference point (i.e., the user's the sight). Therefore, the pixel shift operation may not be performed in vertical or horizontal directions but be performed based on the user's sight, so that the image shaking may not be recognized by the user, the motion sickness and the nausea may be prevented.

BRIEF DESCRIPTION OF THE DRAWINGS

The above and other features of embodiments of the disclosure will become more apparent by describing in detailed embodiments thereof with reference to the accompanying drawings, in which.

DETAILED DESCRIPTION OF THE EMBODIMENTS

Figure 1:
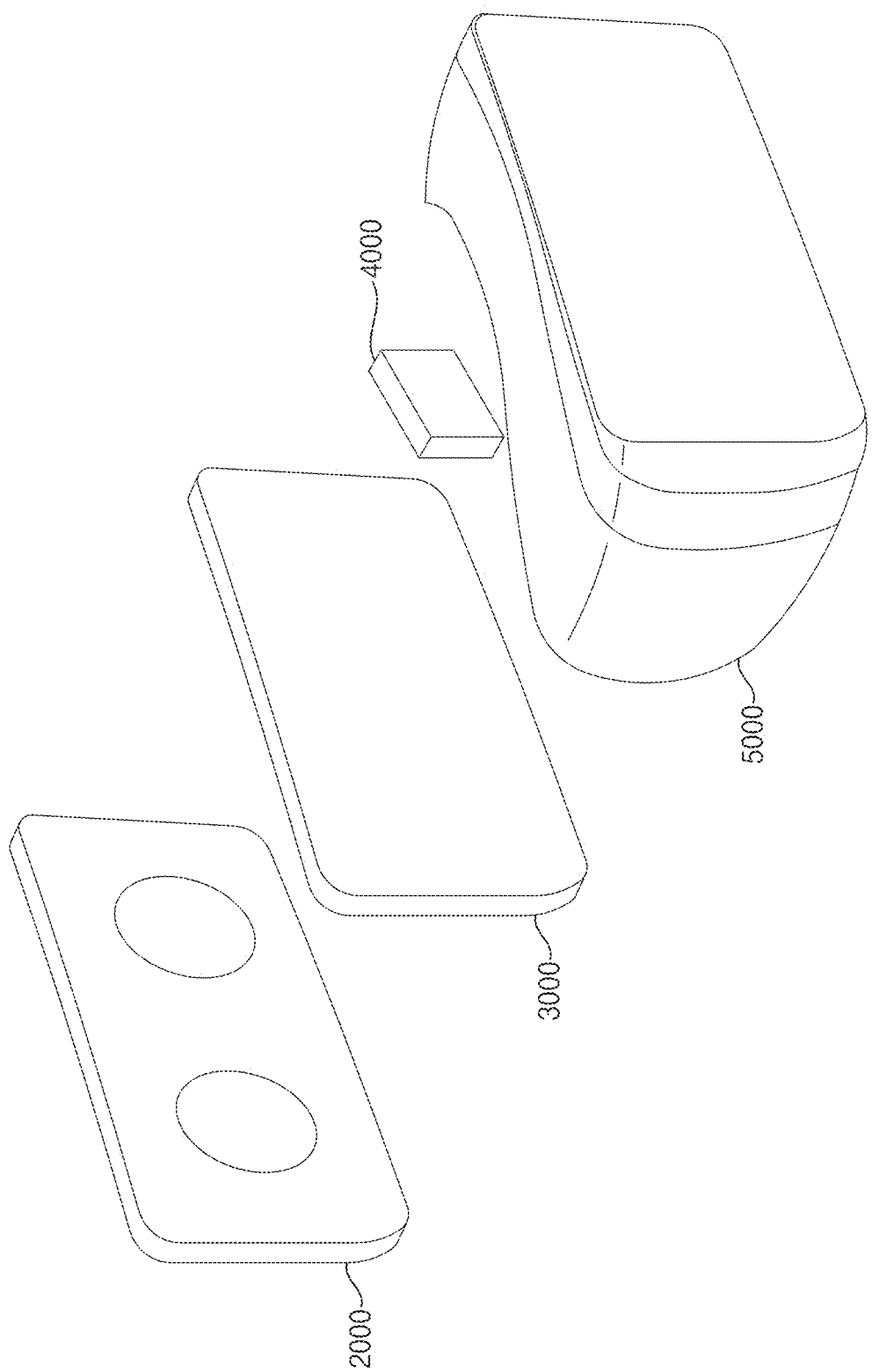
FIG. 1 is a perspective view for illustrating a head mount display system according to embodiments of the disclosure.

Hereinafter, the disclosure will be described in more detail with reference to the accompanying drawings.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a perspective view for illustrating a head mount display system according to embodiments of the disclosure.

Referring to FIG. 1, the head mount display system includes a lens portion 2000, a head mount display device 3000, a camera 4000, and a housing 5000. However, the disclosure is not limited to the camera 4000, and the head mount display system may further include various types of sensors for tracking a user's sight. The head mount display device 3000 may be disposed adjacent to the lens portion 2000. The housing 5000 may accommodate the lens portion 2000, the head mount display device 3000, and the camera 4000. Although FIG. 1 illustrates that the lens portion 2000, the camera 4000, and the housing 5000 are accommodated on a first side of the housing 5000, the disclosure is not limited thereto. For example, the camera 4000 may be accommodated on a second side of the housing 5000. For example, the lens portion 2000 may be accommodated on a first side of the housing 5000, and the head mount display device 3000 may be accommodated on a second side of the housing 5000. In case that the lens portion 2000 and the head mount display device 3000 are accommodated on different sides of the housing 5000, the housing 5000 may have a transmitter for transmitting light.

For example, the head mount display system may be worn on a user's head. Although not illustrated, the head mount display system may further include a head band portion for wearing the head mount display system on the user's head.

Figure 2:
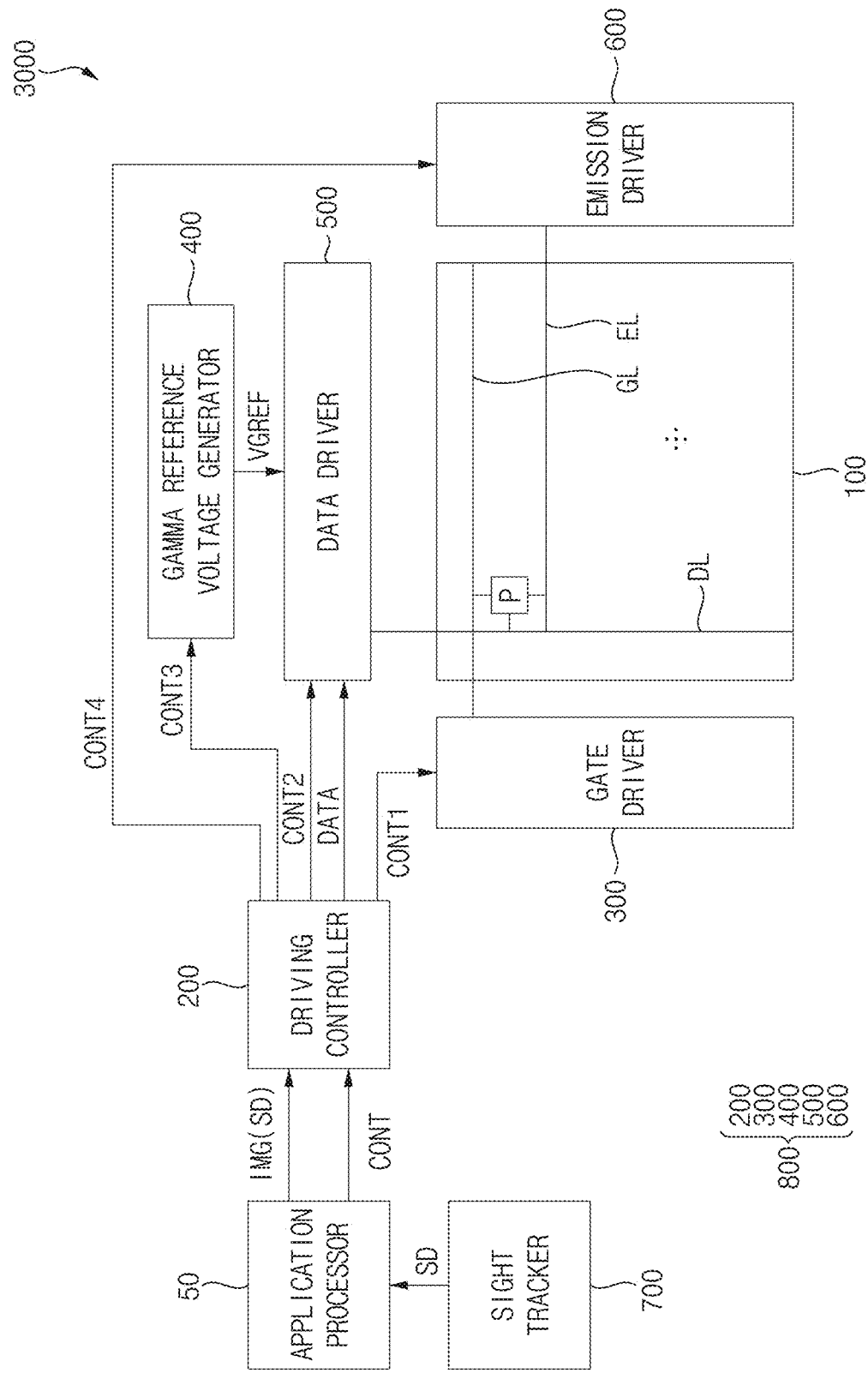
FIG. 2 is a schematic block diagram for illustrating the head mount display device of FIG. 1.
Figure 3A:
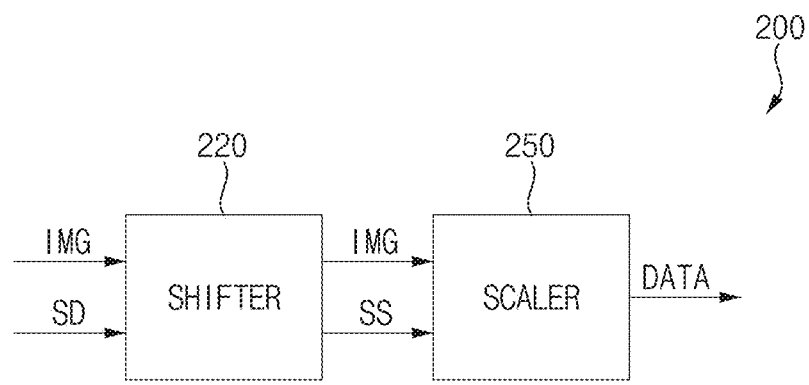
FIG. 3A is a schematic block diagram for illustrating the driving controller of FIG. 2 according to an embodiment of the disclosure.
Figure 3B:
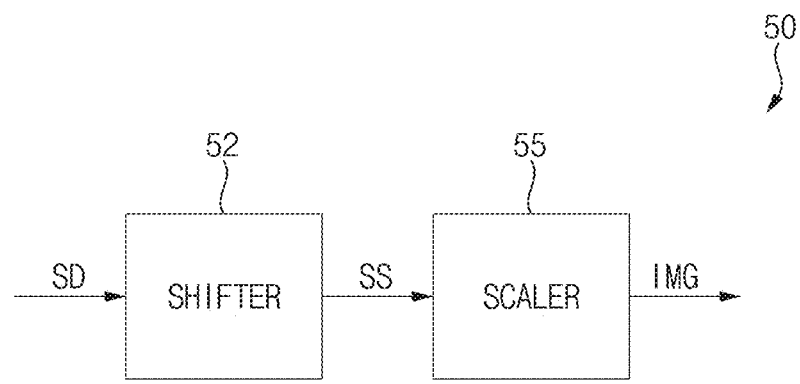
FIG. 3B is a schematic block diagram for illustrating an application processor of FIG. 2 according to an embodiment of the disclosure.

FIG. 2 is a schematic block diagram for illustrating the head mount display device of FIG. 1. FIG. 3A is a schematic block diagram for illustrating the driving controller of FIG. 2 according to an embodiment. FIG. 3B is a schematic block diagram for illustrating an application processor of FIG. 2 according to an embodiment.

Referring to FIGS. 1 to 3B, a head mount display device 3000 may include a display panel 100 and a display panel driver 800. The display panel driver 800 may include a driving controller 200, a gate driver 300, a gamma reference voltage generator 400, a data driver 500, and an emission driver 600. The head mount display device 3000 may further include an application processor 50. In another embodiment, the application processor 50 may be an external component of the head mount display device 3000. The head mount display device 3000 may further include a sight tracker 700. In another embodiment, the sight tracker 700 may be an external component of the head mount display device 3000.

The display panel 100 may include a display portion for displaying an image and a peripheral portion disposed adjacent to the display portion.

In an embodiment, the display panel 100 may be an organic light emitting diode display panel including an organic light emitting diode. In another embodiment, the display panel 100 may be a quantum-dot organic light emitting diode display panel including an organic light emitting diode and a quantum-dot color filter. In another embodiment, the display panel 100 may be a quantum-dot nano light emitting diode display panel including a nano light emitting diode and a quantum-dot color filter. In another embodiment, the display panel 100 may be a liquid crystal display panel including a liquid crystal layer.

The display panel 100 may include gate lines GL, data lines DL, emission lines EL, and pixels P electrically connected to the gate lines GL, the data lines DL, and the emission lines EL.

The driving controller 200 may receive the input image data IMG and the input control signal CONT from the application processor 50. For example, the input image data IMG may include red image data, green image data, and blue image data. According to an embodiment, the input image data IMG may further include white image data. According to another embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT and output the third control signal CONT3 to the gamma reference voltage generator 400.

The driving controller 200 may generate a fourth control signal CONT4 for controlling the operation of the emission driver 600 based on the input control signal CONT and output the fourth control signal CONT4 to the emission driver 600.

The sight tracker 700 may collect movement information of the user's sight by using various types of sensors or the camera 4000, and may calculate a position of the user's sight by using the collected movement information of the user's sight. The sight tracker 700 may output sight data SD including the position of the user's sight to the application processor 50. In an embodiment, the sight data SD may include the position of the user's sight tracked in real time. In another embodiment, in case that the user's sight is present at a first position for a time (e.g., 0.5 sec) or longer, the sight tracker 700 may output sight data SD for the first position.

In an embodiment, as illustrated in FIG. 3A, the driving controller 200 may include a shifter 220 and a scaler 250.

The shifter 220 may divide the display panel 100 into a reference area including a reference point and a peripheral area surrounding the reference area. The reference point may be a position that serves to classify the reference area and the peripheral area according to a separation distance from the reference point. The reference point may be a predetermined position. In another embodiment, the reference point may be a position that may be changed depending on the position of the user's sight. The reference area may be a point having a separation distance less than a separation distance of the peripheral area from the reference point. The shifter 220 may classify each of the reference area and the peripheral area as an upscaling area and a downscaling area. The shifter 220 may generate a shift signal SS based on the upscaling area and the downscaling area. The scaler 250 may scale the input image data IMG based on the shift signal SS. For example, pixel shift operation may be performed through the scaling of the input image data IMG by the scaler 250.

In another embodiment, as illustrated in FIG. 3B, the application processor 50 may include a shifter 52 and a scaler 55. The shifter 52 may divide the display panel 100 into a reference area including a reference point and a peripheral area surrounding the reference area. The shifter 52 may determine each of the reference area RA and the peripheral area PA as an upscaling area or a downscaling area. The shifter 52 may generate a shift signal SS based on the upscaling area and the downscaling area. The scaler 55 may output scaled input image data IMG based on the shift signal SS. However, since operations of the shifter 52 and the scaler 55 of the application processor 50 are substantially the same as operations of the shifter 220 and the scaler 250 of the driving controller 200, the operations of the shifter 220 and the scaler 250 of the driving controller 200 will be described in detail based on the shifter 220 and the scaler 250 of the driving controller 200, respectively.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral portion of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into an analog data voltage using the gamma reference voltage VGREF. The data driver 500 may output the analog data voltage to the data line DL.

The emission driver 600 may generate emission signals for driving the pixels P in response to the fourth control signal CONT4 received from the driving controller 200. The emission driver 600 may output emission signals to the emission lines EL.

Although FIG. 2 illustrates that the gate driver 300 is disposed on a first side of the display panel 100 and the emission driver 600 is disposed on a second side of the display panel 100 for convenience of description, the disclosure is not limited thereto. For example, both the gate driver 300 and the emission driver 600 may be disposed on the first side or the second side of the display panel 100. For example, the gate driver 300 and the emission driver 600 may be integral with each other.

In case that a fixed image on the display panel 100 is displayed for a long time, the pixels P may deteriorate, and an afterimage may occur. The pixel shift operation in which the fixed image is shifted within a certain pixel range may be performed in order to prevent the deterioration and the afterimage.

However, unlike general display devices, the head mount display device 3000 may be disposed close to the user's eyes. Therefore, in case that the pixel shift operation is performed in the head mounted display device, image shaking may be recognized by the user, and accordingly, the user may experience motion sickness or nausea. For example, in case that the pixel shift operation is performed in vertical or horizontal directions, the user may experience motion sickness or nausea.

Figure 4A:
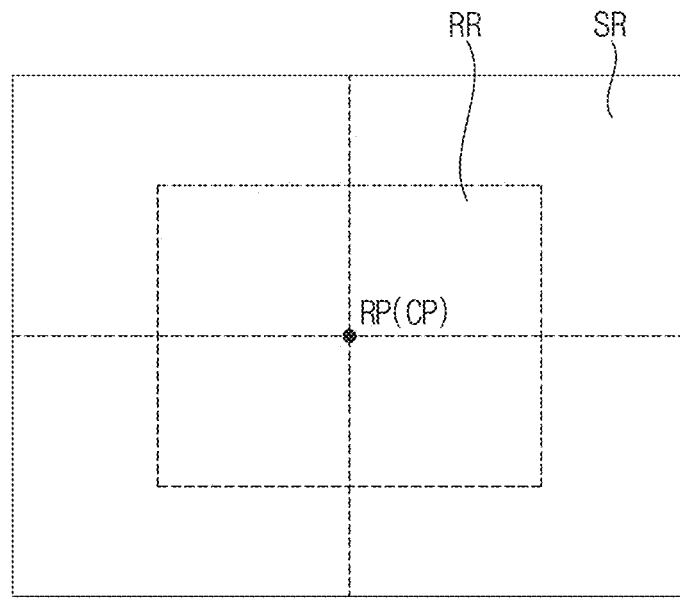
FIG. 4A is a schematic diagram for illustrating a pixel shift operation in which the head mount display device of FIG. 1 scales the input image data according to a reference point according to an embodiment of the disclosure.
Figure 4B:
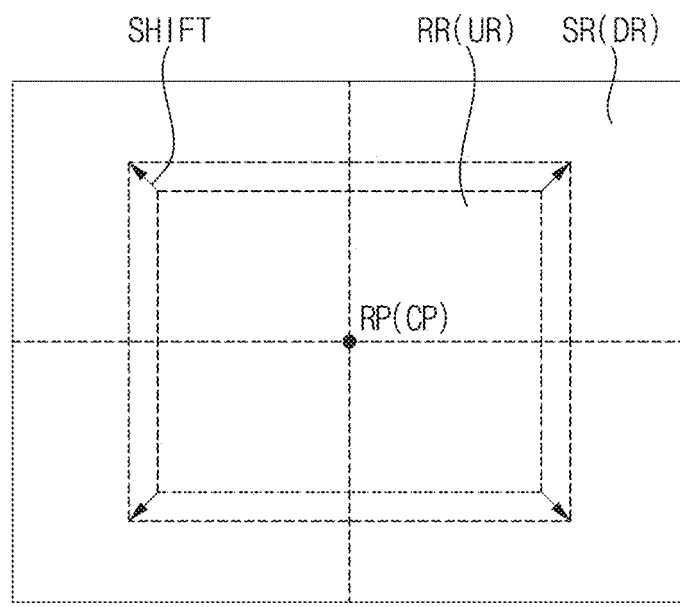
FIG. 4B is a schematic diagram for illustrating the pixel shift operation of FIG. 4A according to an embodiment of the disclosure.
Figure 4C:
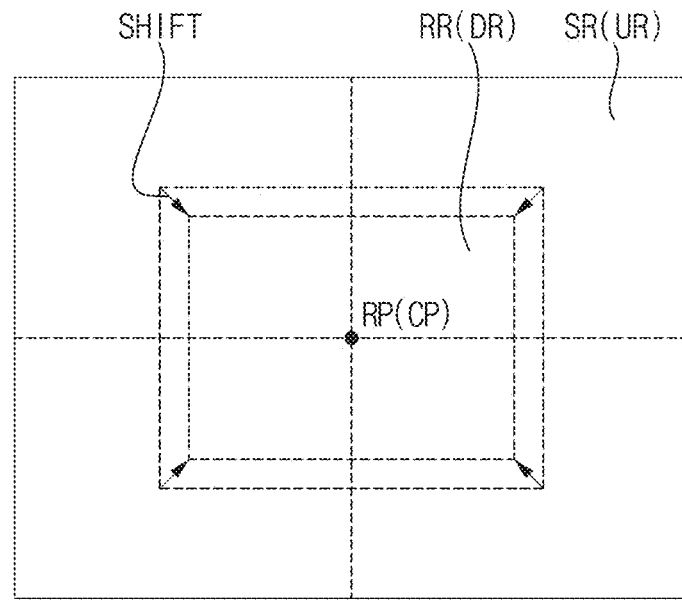
FIG. 4C is a schematic diagram for illustrating the pixel shift operation of FIG. 4A according to an embodiment of the disclosure.

FIG. 4A is a schematic diagram for illustrating a pixel shift operation in which the head mount display device of FIG. 1 scales the input image data according to a reference point according to an embodiment. FIG. 4B is a schematic diagram for illustrating the pixel shift operation of FIG. 4A according to an embodiment. FIG. 4C is a schematic diagram for illustrating the pixel shift operation of FIG. 4A according to an embodiment.

Referring to FIGS. 1 to 4C, a reference point RP may be a center point CP of the display panel 100. Since the position of the user's sight is generally located at the center point CP of the display panel 100, the reference point RP may be the center point CP of the display panel 100. The shifter 220 may classify a reference area RR and a peripheral area SR surrounding the reference area RR based on the reference point RP, which is the center point CP. The shifter 220 may determine each of the reference area RR and the peripheral area SR as an upscaling area UR or a downscaling area DR. The shifter 220 may generate a shift signal SS based on the upscaling area UR and the downscaling area DR. The scaler 250 may scale the input image data IMG based on the shift signal SS. For example, in case that the reference area RR is the upscaling area UR and the peripheral area SR is the downscaling area DR, the scaler 250 may scale the input image data IMG from the reference area RR to the peripheral area SR. For example, in case that the reference area RR is the downscaling area DR and the peripheral area SR is the upscaling area UR, the scaler 250 may scale the input image data IMG from the peripheral area SR to the reference area RR. The input image data IMG may be scaled within a range value (e.g., about 0.95 times to about 1.05 times the reference area RR). The input image data IMG may be scaled at a period.

As described above, the head mount display device 3000 and the head mount display system may perform pixel shift in consideration of the reference point (for example, the position of the user's sight) by dividing the display panel 100 into the reference area RR including the reference point RP and the peripheral area SR surrounding the reference area RR, determining each of the reference area RR and the peripheral area SR as the upscaling area UR or the downscaling area DR, and scaling the input image data IMG based on the upscaling area UR and the downscaling area DR. Accordingly, since the pixel shift is performed based on the user's sight without being performed in the up-down or left-right direction, the pixel shift may not be recognized by the user, and the pixel deterioration and afterimage of the display apparatus may be prevented.

Figure 5A:
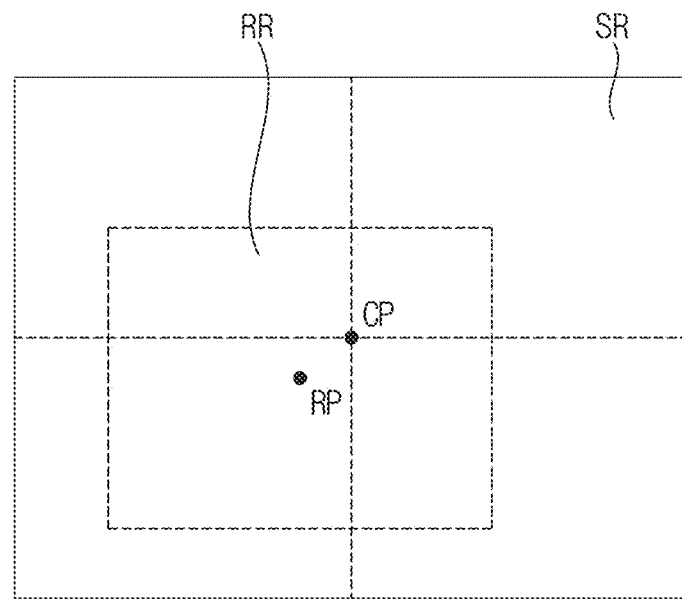
FIG. 5A is a schematic diagram for illustrating a pixel shift operation in which the head mount display device of FIG. 1 scales the input image data according to a reference point according to an embodiment of the disclosure.
Figure 5B:
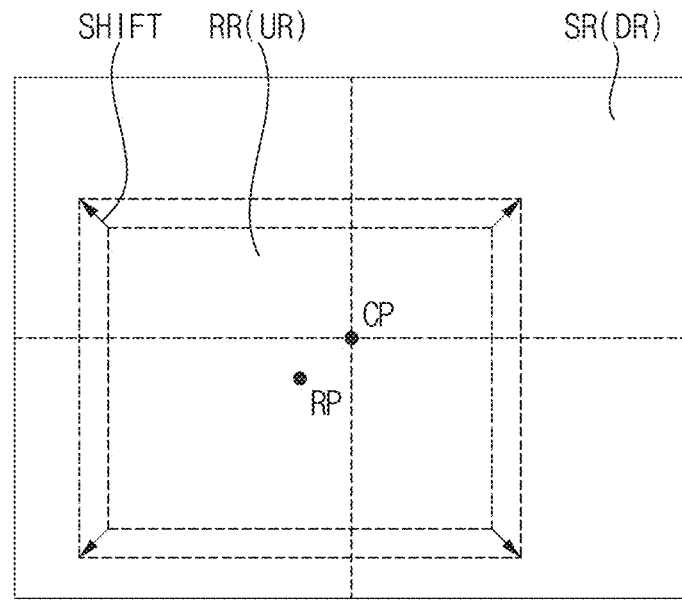
FIG. 5B is a schematic diagram for illustrating the pixel shift operation of FIG. 5A according to an embodiment of the disclosure.
Figure 5C:
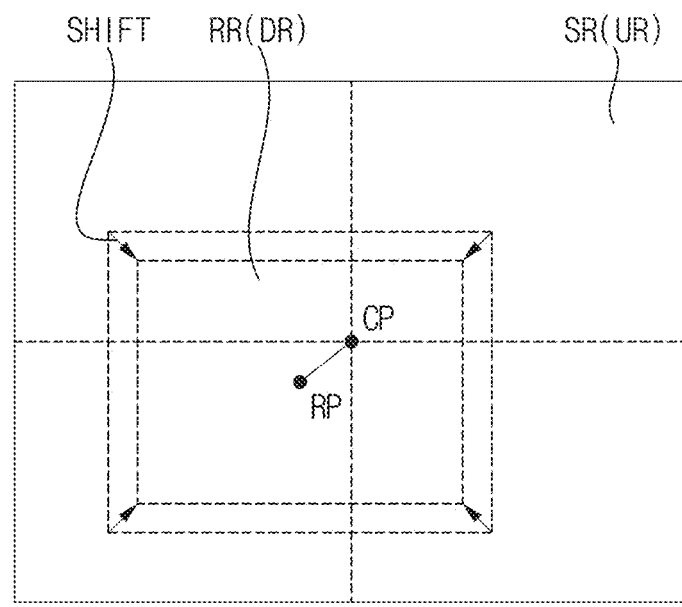
FIG. 5C is a schematic diagram for illustrating the pixel shift operation of FIG. 5A according to an embodiment of the disclosure.

FIG. 5A is a schematic diagram for illustrating a pixel shift operation in which the head mount display device of FIG. 1 scales the input image data according to a reference point according to an embodiment. FIG. 5B is a schematic diagram for illustrating the pixel shift operation of FIG. 5A according to an embodiment. FIG. 5C is a schematic diagram for illustrating the pixel shift operation of FIG. 5A according to an embodiment.

Referring to FIGS. 1 to 5C, the reference point RP may be determined based on the position of the user's sight. Since the position of the user's sight may be changed over time, the reference point RP may be determined based on the sight data SD including the position of the user's sight. In an embodiment, the sight data SD may include the position of the user's sight tracked in real time. In contrast, in case that the position of the user's sight is tracked in real time, the reference point RP may be changed in real time, thereby causing dizziness to the user. Therefore, in case that the user's sight is present at the first position for a time or longer, the sight tracker 700 may output the sight data SD for the first position. The shifter 220 may classify the reference area RR and the peripheral area SR surrounding the reference area RR based on a reference point RP determined based on the sight data SD. The shifter 220 may determine each of the reference area RR and the peripheral area SR as an upscaling area UR or a downscaling area DR. The shifter 220 may generate a shift signal SS based on the upscaling area UR and the downscaling area DR. The scaler 250 may scale the input image data IMG based on the shift signal SS. For example, in case that the reference area RR is the upscaling area UR and the peripheral area SR is the downscaling area DR, the scaler 250 may scale the input image data IMG from the reference area RR to the peripheral area SR. For example, in case that the reference area RR is the downscaling area DR and the peripheral area SR is the upscaling area UR, the scaler 250 may scale the input image data IMG from the peripheral area SR to the reference area RR. The input image data IMG may be scaled within a range value. The input image data IMG may be scaled at a period.

As described above, the head mount display device 3000 and the head mount display system may perform pixel shift in consideration of the reference point (for example, the position of the user's sight) by dividing the display panel 100 into the reference area RR including the reference point RP and the peripheral area SR surrounding the reference area RR, determining each of the reference area RR and the peripheral area SR as an upscaling area UR or a downscaling area DR, and scaling the input image data IMG based on the upscaling area UR and the downscaling area DR. Accordingly, since the pixel shift is performed based on the user's sight without being performed in the up-down or left-right direction, the pixel shift may not be recognized by the user, and the pixel deterioration and afterimage of the display apparatus may be prevented.

Figure 6A:
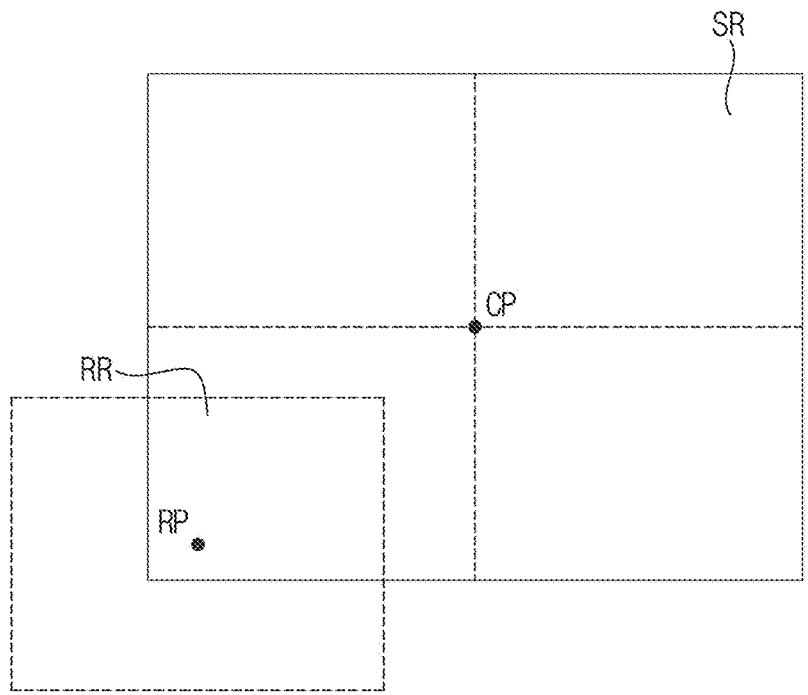
FIG. 6A is a schematic diagram for illustrating a pixel shift operation in which the head mount display device of FIG. 1 scales the input image data according to a reference point according to an embodiment of the disclosure.
Figure 6B:
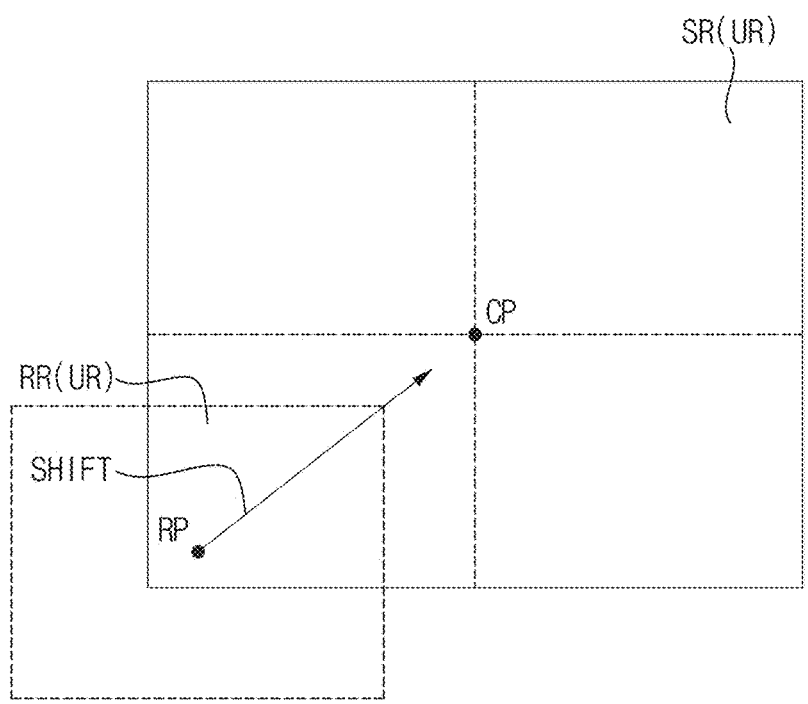
FIG. 6B is a schematic diagram for illustrating the pixel shift operation of FIG. 6A according to an embodiment of the disclosure.
Figure 6C:
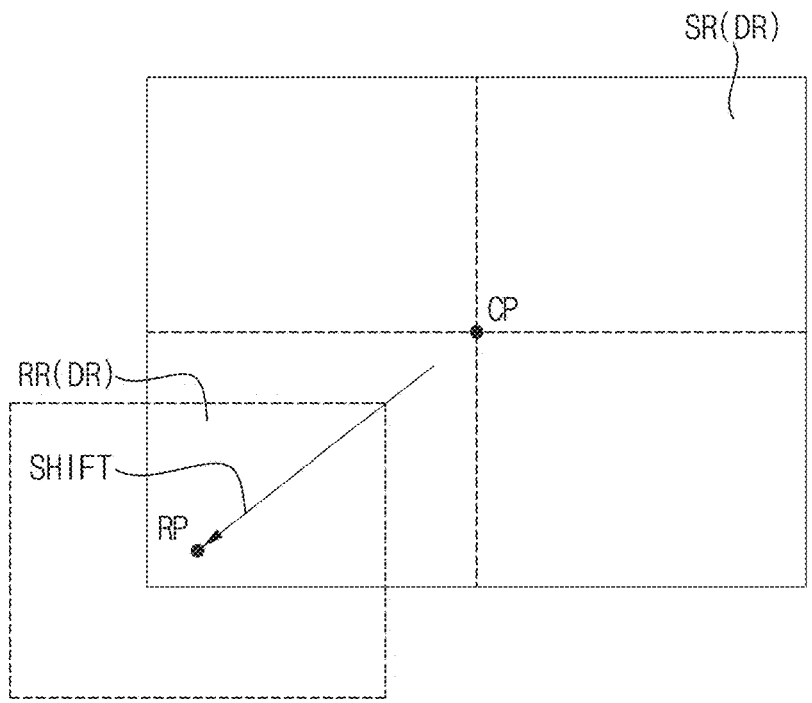
FIG. 6C is a schematic diagram for illustrating the pixel shift operation of FIG. 6A according to an embodiment of the disclosure.

FIG. 6A is a schematic diagram for illustrating a pixel shift operation in which the head mount display device of FIG. 1 scales the input image data according to a reference point according to an embodiment. FIG. 6B is a schematic diagram for illustrating the pixel shift operation of FIG. 6A according to an embodiment. FIG. 6C is a schematic diagram for illustrating the pixel shift operation of FIG. 6A according to an embodiment.

Referring to FIGS. 1 to 6C, unlike the reference point RP of FIG. 5A, the reference point RP of FIG. 6A may be located adjacent to an edge of the display panel 100 or outside the display panel 100. The shifter 220 may classify the reference area RR and the peripheral area SR surrounding the reference area RR based on the reference point RP determined based on the sight data SD, and the shifter 220 may determine the entire reference area RR and peripheral area SR as the upscaling area UR or the downscaling area DR The shifter 220 may generate a shift signal SS based on the upscaling area UR and the downscaling area DR. The scaler 250 may scale the input image data IMG based on the shift signal SS. For example, the scaler 250 may upscale the entire input image data IMG. For example, the scaler 250 may downscale the entire input image data IMG. The input image data IMG may be scaled within a range value. The input image data IMG may be scaled at a period.

As described above, the head mount display device 3000 and the head mount display system may perform pixel shift in consideration of the reference point (for example, the position of the user's sight) by dividing the display panel 100 into the reference area RR including the reference point RP and the peripheral area SR surrounding the reference area RR, determining each of the reference area RR and the peripheral area SR as an upscaling area UR or a downscaling area DR, and scaling the input image data IMG based on the upscaling area UR and the downscaling area DR. Accordingly, since the pixel shift is performed based on the user's sight without being performed in the up-down or left-right direction, the pixel shift may not be recognized by the user, and the pixel deterioration and afterimage of the display apparatus may be prevented.

Figure 7:
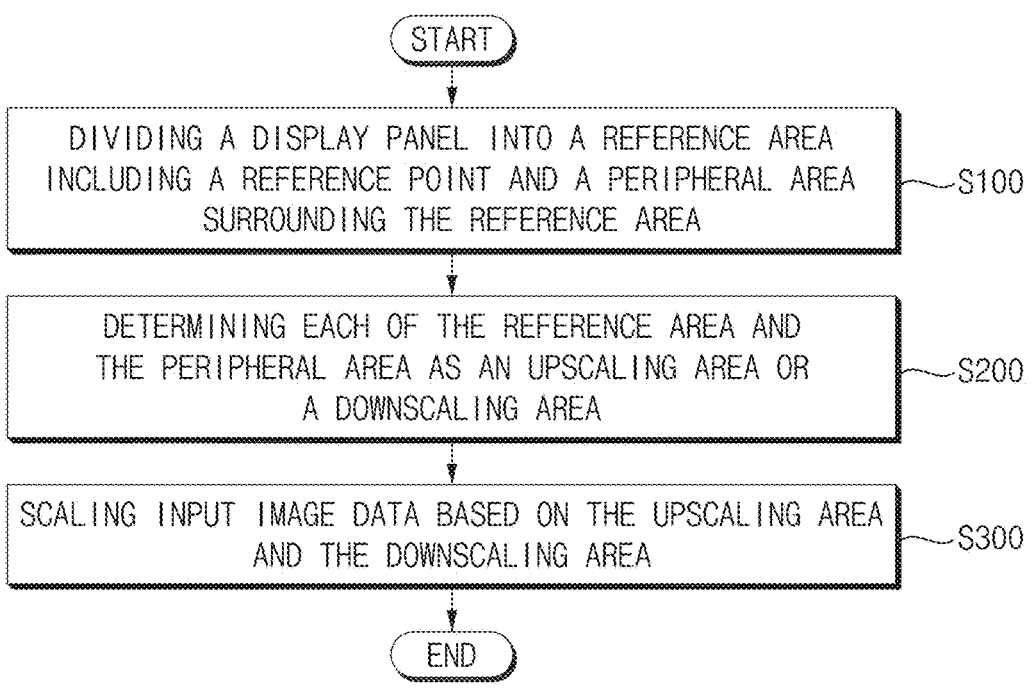
FIG. 7 is a flowchart illustrating a method for compensating an image of a head mount display device.

FIG. 7 is a flowchart illustrating a method for compensating an image of a head mount display device.

Referring to FIGS. 1 to 7, the method for compensating an image of a head mount display device may include dividing the display panel 100 into a reference area RR including a reference point RP and a peripheral area SR surrounding the reference area RR (S100), determining each of the reference area RR and the peripheral area SR as an upscaling area UR or a downscaling area DR (S200), and scaling an input image data IMG based on the upscaling area UR and the downscaling area DR (S300).

In an embodiment, the method for compensating an image of a head mount display device may include outputting the sight data SD including the position of the user's sight on the display panel 100.

As described above, with the method for compensating an image of a head mount display device, pixel shift may be performed in consideration of the reference point (for example, the position of the user's sight) by dividing the display panel 100 into the reference area RR including a reference point RP and a peripheral area SR surrounding the reference area RR, determining each of the reference area RR and the peripheral area SR as an upscaling area UR or a downscaling area DR, and scaling an input image data IMG based on the upscaling area UR and the downscaling area DR. Accordingly, since the pixel shift is performed based on the user's sight without being performed in the up-down or left-right direction, the pixel shift may not be recognized by the user, and the pixel deterioration and afterimage of the display apparatus may be prevented.

Figure 8:
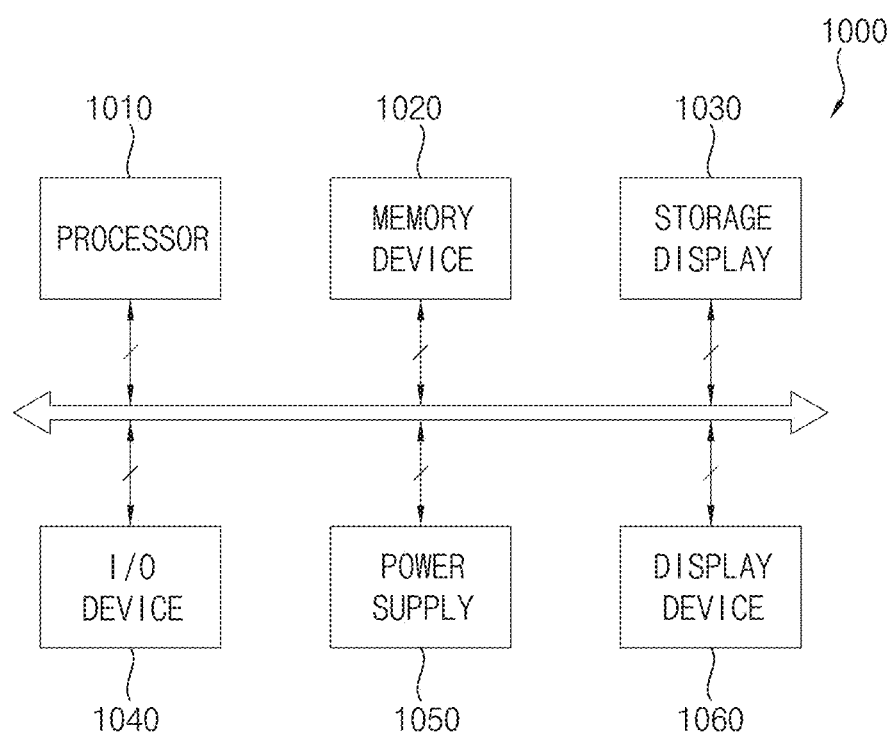
FIG. 8 is a block diagram for illustrating an electronic device.

FIG. 8 is a block diagram for illustrating an electronic device.

Referring to FIG. 8, an electronic device 1000 may include a processor 1010, a memory device 1020, a storage device 1030, an input/output (I/O) device 1040, a power supply 1050, and a display device 1060. The display device 1060 may be a head mount display device 3000 in FIG. 1. The electronic device 1000 may further include multiple ports for communicating with a video card, a sound card, a memory card, a universal serial bus (USB) device, another electronic device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/0 device 1040 may include the display device 1060.

The power supply 1050 may provide power for operations of the electronic device 1000.

The display device 1060 may be connected to other components through buses or other communication links.

The disclosure may be applied to any display device and any electronic device including a display screen. For example, the disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A head mount display device for performing pixel shift, the head mount display device comprising:
a display panel including pixels;
a shifter that divides the display panel into a reference area including a reference point and a peripheral area surrounding the reference area, and determines each of the reference area and the peripheral area as one of an upscaling area and a downscaling area; and
a scaler that shifts input image data corresponding to the upscaling area to expand an image in the upscaling area and shifts input image data corresponding to the downscaling area to compress an image in the downscaling area.

2. The head mount display device of claim 1, wherein the reference point is a center point of the display panel.

3. The head mount display device of claim 1, further comprising:
a sight tracker that outputs sight data including a position of a user's sight on the display panel.

4. The head mount display device of claim 3, wherein the reference point is determined based on the sight data.

5. The head mount display device of claim 3, wherein the sight data includes the position of the user's sight tracked in real time.

6. The head mount display device of claim 3, wherein, in case that the user's sight is present at a first position for a time or longer, the sight tracker outputs the sight data for the first position.

7. The head mount display device of claim 1, wherein, in case that the reference area is the upscaling area and the peripheral area is the downscaling area, the input image data is scaled from the reference area to the peripheral area.

8. The head mount display device of claim 1, wherein, in case that the reference area is the downscaling area and the peripheral area is the upscaling area, the input image data is scaled from the peripheral area to the reference area.

9. The head mount display device of claim 1, wherein the input image data is scaled at a period.

10. The head mount display device of claim 1, wherein the input image data is scaled within a range value.

11. A method for compensating an image of a head mount display device, the method comprising:
dividing a display panel into a reference area including a reference point and a peripheral area surrounding the reference area;
determining each of the reference area and the peripheral area as one of an upscaling area and a downscaling area; and
shifting input image data corresponding to the upscaling area to expand an image in the upscaling area and shifting input image data corresponding to the downscaling area to compress an image in the downscaling area.

12. The method of claim 11, wherein the reference point is a center point of the display panel.

13. The method of claim 11, further comprising:
outputting sight data including a position of a user's sight on the display panel.

14. The method of claim 13, wherein the reference point is determined based on the sight data.

15. The method of claim 13, wherein the sight data includes the position of the user's sight tracked in real time.

16. The method of claim 13, further comprising:
in case that the user's sight is present at a first position for a time or longer, outputting the sight data for the first position.

17. The method of claim 11, wherein, in case that the reference area is the upscaling area and the peripheral area is the downscaling area, the input image data is scaled from the reference area to the peripheral area.

18. The method of claim 11, wherein, in case that the reference area is the downscaling area and the peripheral area is the upscaling area, the input image data is scaled from the peripheral area to the reference area.

19. A head mount display system for performing pixel shift, the head mount display system comprising:
a display panel including pixels;
a driving controller that receives input image data from an application processor and converts the input image data into a data signal; and
a data driver that outputs a data voltage to the display panel based on the data signal,
wherein the application processor includes:
a shifter that divides the display panel into a reference area including a reference point and a peripheral area surrounding the reference area, and determines each of the reference area and the peripheral area as one of an upscaling area and a downscaling area; and
a scaler that shifts input image data corresponding to the upscaling area to expand an image in the upscaling area and shifts input image data corresponding to the downscaling area to compress an image in the downscaling area.

20. The head mount display system of claim 19, further comprising:
a sight tracker that outputs sight data including a position of a user's sight on the display panel.

21. An electronic device for performing pixel shift, the electronic device comprising:
a display panel including pixels;
a driving controller that converts input image data into a data signal;
a data driver that outputs a data voltage to the display panel based on the data signal; and
an application processor that outputs the input image data to the driving controller,
wherein the driving controller includes:
a shifter that divides the display panel into a reference area including a reference point and a peripheral area surrounding the reference area, and determines each of the reference area and the peripheral area as one of an upscaling area and a downscaling area; and
a scaler that shifts input image data corresponding to the upscaling area to expand an image in the upscaling area and shifts input image data corresponding to the downscaling area to compress an image in the downscaling area.

* * * * *